United States Patent [19]

Kotthaus et al.

[11] 4,090,428
[45] May 23, 1978

[54] APPARATUS FOR DRIVING THE GENERATING OR ROLLING CRADLE OF A GEAR-CUTTING MACHINE

[75] Inventors: Erich Kotthaus, Wallisellen; Otto Hildinger, Schwerzenbach, both of Switzerland

[73] Assignee: Werkzeugmaschinenfabrik Oerlikon-Buhrle, Zurich, Switzerland

[21] Appl. No.: 664,924

[22] Filed: Mar. 8, 1976

[30] Foreign Application Priority Data

Mar. 27, 1975 Switzerland ............... 3959/75

[51] Int. Cl.² ............................................. B23F 9/10
[52] U.S. Cl. ............................................. 90/6
[58] Field of Search ............... 90/1, 3, 5, 6; 51/287

[56] References Cited

U.S. PATENT DOCUMENTS

| | | | |
|---|---|---|---|
| 3,464,312 | 9/1969 | Takahashi et al. | 90/5 |
| 3,653,290 | 4/1972 | Hunkeler | 90/5 |

Primary Examiner—Othell M. Simpson
Assistant Examiner—Z. R. Bilinsky
Attorney, Agent, or Firm—Werner W. Kleeman

[57] ABSTRACT

An apparatus for driving the generating or rolling cradle of a gear-cutting machine, comprising a variable-speed motor for changing the generating or rolling speed. A cam plate is secured to the rolling cradle in order to control the variable-speed motor as a function of the position of the rolling cradle.

5 Claims, 5 Drawing Figures

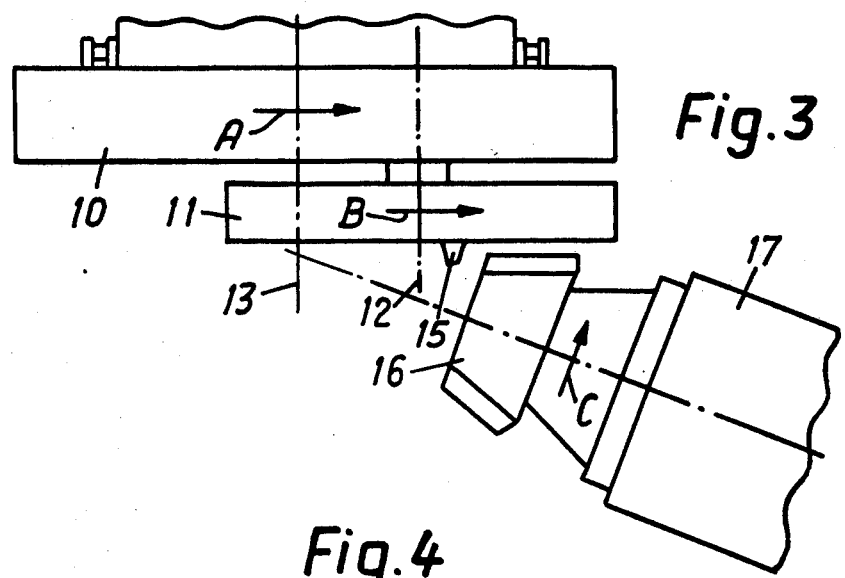
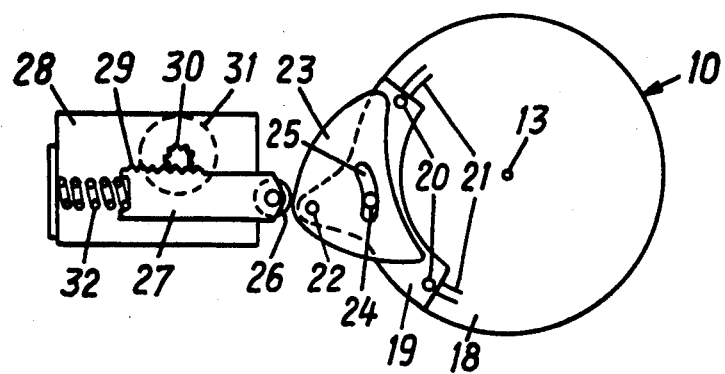

APPARATUS FOR DRIVING THE GENERATING OR ROLLING CRADLE OF A GEAR-CUTTING MACHINE

BACKGROUND OF THE INVENTION

The present invention relates to a new and improved construction of apparatus for driving the rolling cradle of a gear-cutting machine of the type comprising a variable-speed motor for changing the generating speed.

In the case of gear-cutting machines it is already known to the art to change the rotational speed of the tool as a function of the cutter diameter or as a function of the work-piece diameter if there are produced bevel gears according to the Palloid technique with cone-shaped tools.

Further, it is known during grinding of gears to alter the generating speed as a function of the grinding stroke in the lengthwise direction of the gear teeth.

With these known apparatuses it is however not possible to accommodate the generating speed to the optimum cutting capacity or efficiency. At the beginning of the generating operation, with constant generating speed, the cutting capacity is considerably greater than at the end of the rolling operation. If the generating speed remains constant during the entire manufacturing operation, then the cutting efficiency either is too great at the start or too small at the end.

SUMMARY OF THE INVENTION

Hence, it is a primary object of the present invention to provide an improved construction of apparatus of the character described which is not associated with the aforementioned drawbacks and limitations of the prior art proposals.

Another object of the present invention aims at the provision of a new and improved construction of apparatus wherein it is possible to accommodate the generating speed to the optimum cutting capacity during the rolling operation.

Now in order to implement these and still further objects of the invention, which will become more readily apparent as the description proceeds, the apparatus of this development is manifested by the features that a cam plate or cam means is secured to the rolling cradle for controlling the variable-speed motor as a function of the position of the rolling cradle.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is a plan view of the rolling cradle of FIG. 1;

FIG. 4 is a rear view of the rolling cradle of FIG. 1; and

FIG. 5 is an electrical circuit diagram.

DETAILED DESCRIPTION OF THE PREFERRED EMBODIMENTS

Figure 1:
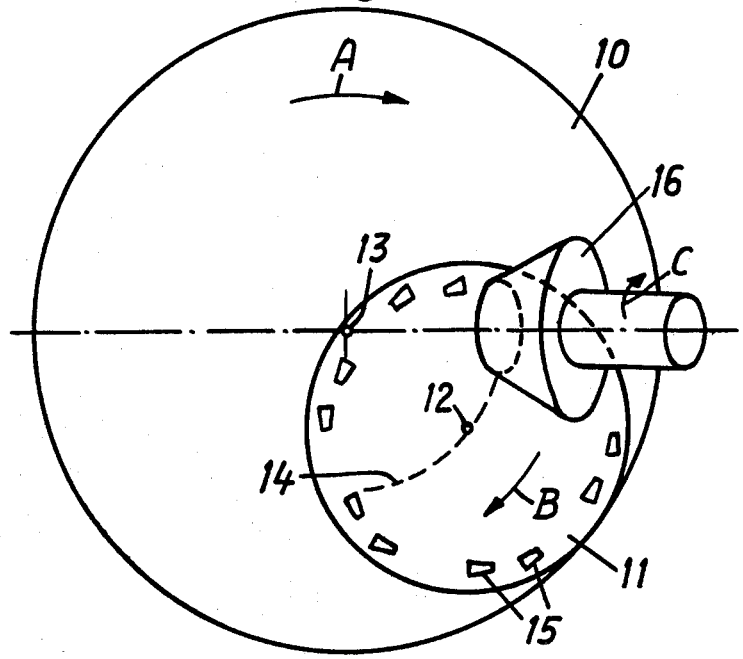
FIG. 1 is a front view of the rolling cradle of a gear cutting machine.
Figure 2:
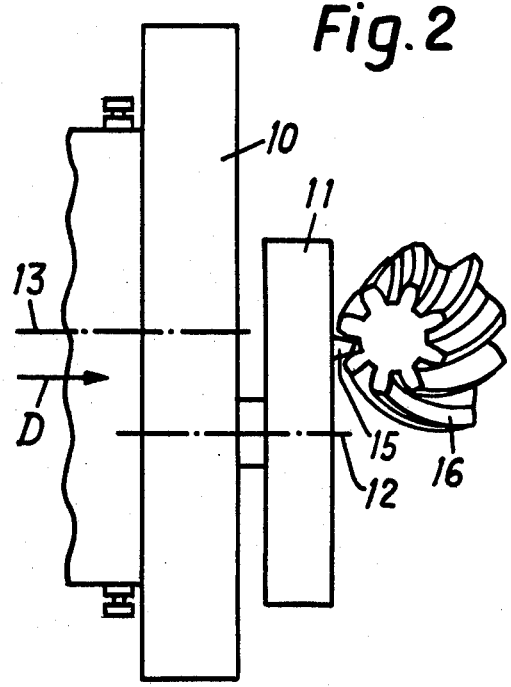
FIG. 2 is a side view of the rolling cradle shown in FIG. 1.

Describing now the drawings, according to the showing of FIGS. 1, 2 and 3 a cutter head 11 is rotatably mounted about the cutter head axis 12 upon a rolling cradle 10. The rolling cradle 10 rotates about a rolling cradle axis 13, and the cutter head axis 12 moves along a circular arc 14 (FIG. 1). Attached to the cutter head 11 are a number of cutters 15 which move along a circular path about the cutter head axis 12. These cutters 14 are in engagement with a workpiece 16 which is rotatably mounted upon a headstock 17 (FIG. 3). The three arrows A, B and C indicate the direction of rotation of the rolling cradle 10, the cutter head 11 and the workpiece 16, respectively. In the event that the gear 16 is produced with a cutting-in depth technique, then the rolling cradle 10 moves relative to the workpiece 16 in the direction of the arrow D (FIG. 2).

From the above comments it will be recognized that due to the rotation of the rolling cradle 10 in the direction of the arrow A the cutters 15 roll-off upon the teeth flanks of the workpiece 16. A more exact inspection of this generating operation or generating roll has shown that with constant generating speed the cutting efficiency or capacity is not constant. The generating operation is necessary for an involute-shaped tooth since the cutters or knives 15 are of trapezoidal shape and an involute-shaped tooth flank only then appears at the workpiece due to the generating operation. However, if in as short as possible time there is to be manufactured a gear, then the generating operation must be controlled such that the cutting capacity or efficiency is optimum while taking into account the addendum cut, so that there can be continually worked with optimum cutting efficiency or capacity.

In order to control the generating operation or generating roll, according to the showing of FIG. 4, there is attached a disk 18 at the rolling cradle 10, the center of which coincides with the rolling cradle axis 13. At this disk 18 there is secured a cam holder 19 by means of screws 20 within grooves 21 of the disk or plate 18. The cam holder 19 can be shifted in the grooves 21 in the peripheral direction of the rolling cradle 10. A cam 23 is pivotable about the axis or shaft 22 at the cam holder 19 and can be fixed by a screw 24 or equivalent structure in a desired position. The screw 24 is threaded into a threaded hole of the cam holder 19 and protrudes through an arcuate elongated hole 25 of the cam 23.

Bearing against the cam 23 is a follower roll 26 which is rotatably mounted at a pusher element 27. This pusher element or slide 27 is displaceably mounted in a housing 28. The housing 28 is appropriately secured in a not particularly illustrated manner at the stationary portion of the gear cutting machine. At the pusher 27 there is provided a gear rack 29 which meshes with a pinion 30 secured at a commercially available, conventional rotary potentiometer 31. A spring 32, which bears at one end at the housing 28 and at the other end at the pusher 27, urges the pusher 27 together with the follower roll 26 against the cam 23.

According to the showing of FIG. 5 the rotary potentiometer 31 is arranged between two further adjustable potentiometers 39 and 33. These two potentiometers are connected parallel to one another at a power network 34, 35. An amplifier 36 is arranged between the conductor 35 of the network and the rotary potentiometer 31. At this amplifier 36 there is connected a regulator or variable-speed motor 37 which drives the rolling cradle 10. In order to be able to read-off at any time the rotational speed of the variable-speed motor 37 there is additionally provided a tachogenerator 38.

Having now had the benefit of the foregoing discussion of the apparatus of this development, its mode of operation will be considered and is as follows:

The desired starting speed is adjusted manually at the potentiometer 39 and the desired terminal speed is adjusted manually at the potentiometer 33. The cam 23 is adjusting at the rolling cradle 10 such that at the start of the generating operation the follower roll 26 is located at the highest or high point of the cam 23. This means that during the generating operation the pinion 30 rotates continually in the counterclockwise direction, and the potentiometer 31 is adjusted only in one rotational sense. According to the showing of FIG. 5 the tap of the potentiometer 31 thus moves from the left towards the right. The rolling cradle 10 thus rotates at the beginning of the generating operation at the speed determined by the potentiometer 39 and at the end of the generating operation at the speed determined by the potentiometer 33. The transition from the starting speed to the terminal speed is determined by the shape of the cam 23 i.e. for instance its high and low points. The slope of this curve can be changed by rocking the cam 23 about the shaft 22. The curve thus can be configured such that the speed can be changed in such a manner that the material removal capacity or efficiency remains constant during the entire generating operation.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. A method of cutting gears, especially bevel gears having a plurality of tooth slots from a workpiece, comprising the steps of:
   rotatably supporting a workpiece;
   rotatably supporting a cutter head on a rolling cradle for rotation about a cutter head axis;
   placing the cutter head into engagement with the workpiece while producing a generating roll movement of the rolling cradle;
   rotating the cutter head at a substantially constant cutting speed;
   rotating the workpiece at a substantially constant rotational speed while maintaining the cutter engaged with the workpiece; and
   continually increasing the speed of the generating roll movement of the cradle from a given starting value up to a given terminal value while the cutter is in cutting engagement with the workpiece such that all the tooth slots of the gear from the workpiece are completely cut at the end of said generating roll movement.

2. The method as defined in claim 1, wherein: the generating roll speed is increased such that the cutting capacity remains constant.

3. A gear cutting machine for cutting gears, especially bevel gears with a generating operation, comprising:
   means for rotatably supporting a workpiece;
   a rolling cradle having cutter head means mounted thereto and rotatable about a cutter head axis for cutting said workpiece;
   an electrical regulator motor for driving the rolling cradle at a variable generating roll speed;
   means for rotating the cutter head means about its axis;
   means for controlling the generating roll speed as a function of the rotation of said rolling cradle;
   said controlling means comprising:
      a cam secured to the rolling cradle;
      a first potentiometer activated by the cam in order to control the transition of the generating roll speed from a starting speed to a terminal speed;
      a second potentiometer for adjusting the starting rolling speed of the rolling cradle;
      a third potentiometer for adjusting the terminal rolling speed of the rolling cradle.

4. A gear cutting machine for cutting gears, especially bevel gears by means of a generating operation, comprising in combination:
   means for rotatably supporting a workpiece;
   a rolling cradle having cutter head means mounted thereto and rotatable about a cutter head axis for cutting said workpiece;
   an electrical regulator motor for driving the rolling cradle at a variable generating speed;
   means for rotating the cutter head means about its axis;
   means for controlling the generating speed as a function of the angle of rotation of the rolling cradle;
   said controlling means comprising;
      a cam secured to the rolling cradle;
      a first potentiometer actuated by the cam as a function of the angle of rotation of the following cradle;
      a second potentiometer for adjusting the starting speed of the rolling cradle;
      a third potentiometer for adjusting the terminal speed of the rolling cradle;
      power supply means having two terminals;
      said second and third potentiometers being connected parallel to one another between both terminals of said power supply means;
      said first potentiometer being connected in circuit with said second and third potentiometers;
      said regulator motor being connected in circuit with the first potentiometer and with one terminal of the power supply means.

5. The gear cutting machine as defined in claim 4, further including:
   a follower roll for actuating the first potentiometer co-operating with the cam;
   said cam having a high point and a low point;
   said cam being structured such that at the start of the generating movement the follower roll bears against the high point of the cam and at the end of the generating movement said follower roll bears against the low point of said cam.

* * * * *